US008907041B2

(12) United States Patent
Nishiguchi et al.

(10) Patent No.: US 8,907,041 B2
(45) Date of Patent: *Dec. 9, 2014

(54) GRANULAR POLYURETHANE RESIN COMPOSITION AND MOLDED ARTICLE OF THE SAME

(71) Applicant: Mitsui Chemicals, Inc., Tokyo (JP)

(72) Inventors: Daisuke Nishiguchi, Ichihara (JP); Kei Ootsuki, Tokyo (JP); Satoshi Yamasaki, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/035,603

(22) Filed: Sep. 24, 2013

(65) Prior Publication Data

US 2014/0024797 A1    Jan. 23, 2014

Related U.S. Application Data

(62) Division of application No. 12/682,858, filed as application No. PCT/JP2008/068577 on Oct. 14, 2008, now abandoned.

(30) Foreign Application Priority Data

Oct. 15, 2007  (JP) ................................. 2007-268013

(51) Int. Cl.
C08G 18/10 (2006.01)
C08G 18/72 (2006.01)
C08G 18/75 (2006.01)
C08G 18/71 (2006.01)
B29C 41/18 (2006.01)
B60R 13/02 (2006.01)
B29K 75/00 (2006.01)

(52) U.S. Cl.
CPC ............ *C08G 18/753* (2013.01); *C08G 18/722* (2013.01); *C08G 18/757* (2013.01); *C08G 18/71* (2013.01); *C08G 18/10* (2013.01); *C08G 18/758* (2013.01); *C08G 2140/00* (2013.01); *B29C 41/18* (2013.01); *B60R 13/02* (2013.01); *B29K 2075/00* (2013.01)
USPC ................... 528/85; 528/44; 528/65; 528/67; 264/302

(58) Field of Classification Search
CPC ...... C08G 18/00; C08G 18/753; C08G 18/04; C08G 18/06; C08G 2140/00; B29C 41/18
USPC ............. 528/44, 59, 65, 67, 85; 525/50, 452, 525/453, 455, 457, 458, 459, 460; 521/50, 521/65, 66, 67, 68, 69, 134, 137, 155, 170, 521/174; 264/302
See application file for complete search history.

(56) References Cited

U.S. PATENT DOCUMENTS

| | | | |
|---|---|---|---|
| 4,395,529 A | 7/1983 | Panandiker et al. | |
| 4,467,114 A | 8/1984 | Zengel et al. | |
| 4,525,491 A | 6/1985 | Narisawa et al. | |
| 4,565,835 A | 1/1986 | Oertel et al. | |
| 5,272,227 A | 12/1993 | Munk | |
| 5,523,467 A | 6/1996 | Okazaki et al. | |
| 5,571,623 A | 11/1996 | Kuriyama et al. | |
| 5,750,580 A | 5/1998 | Mayer et al. | |
| 5,906,704 A | 5/1999 | Matsuura et al. | |
| 6,242,555 B1 | 6/2001 | Du Prez et al. | |
| 7,232,859 B2 | 6/2007 | Argyropoulos et al. | |
| 2002/0032297 A1 | 3/2002 | Carlson et al. | |
| 2004/0087754 A1 | 5/2004 | Foley et al. | |
| 2005/0107562 A1 | 5/2005 | Leberfinger et al. | |
| 2005/0209427 A1 | 9/2005 | Detrembleur et al. | |
| 2006/0058453 A1 | 3/2006 | Argyropoulos et al. | |
| 2007/0148471 A1 | 6/2007 | Rukavina et al. | |
| 2007/0265388 A1 | 11/2007 | Argyropoulos et al. | |
| 2008/0070043 A1 | 3/2008 | Arai et al. | |
| 2010/0216905 A1 | 8/2010 | Kuwamura et al. | |
| 2010/0227985 A1 | 9/2010 | Nishiguchi et al. | |
| 2010/0305294 A1 | 12/2010 | Kanayama et al. | |

FOREIGN PATENT DOCUMENTS

| | | |
|---|---|---|
| CN | 1708524 A | 12/2005 |
| FR | 1408314 | 8/1965 |
| JP | 58-025364 A | 2/1983 |
| JP | 59-117521 A | 7/1984 |
| JP | 59-145129 A | 8/1984 |
| JP | 59-187019 A | 10/1984 |
| JP | 60-032815 A | 2/1985 |
| JP | 04-233930 | 8/1992 |
| JP | 05-086161 A | 4/1993 |
| JP | 06-091682 A | 4/1994 |
| JP | 07-126521 A | 5/1995 |

(Continued)

OTHER PUBLICATIONS

Office Action U.S. Appl. No. 12/682,714 dated Aug. 15, 2013.
Advisory Action U.S. Appl. No. 12/682,714 dated Jan. 20, 2012.
Baole Han et al., "Applications of Polyurethanes in Modern Automobile Industry", CPUIA Conference 2006, pp. 44-59.
Communication (Supplementary EP Search Report) in EP Appln No. 08 83 9749 dated Nov. 30, 2011.
Dow Answer Center. Calculations to determine OH number; updated Dec. 30, 2010.
Final Office Action U.S. Appl. No. 12/682,714 dated Jan. 2, 2013.
Final Office Action U.S. Appl. No. 12/682,714 dated Jul. 13, 2011.

(Continued)

Primary Examiner — Frances Tischler
(74) Attorney, Agent, or Firm — Foley & Lardner LLP

(57) ABSTRACT

Disclosed is a granular polyurethane resin composition containing a thermoplastic polyurethane resin which contains a hard segment obtained by a reaction between a polyisocyanate and a chain extender. The polyisocyanate contains isocyanate groups of 1,4-bis(isocyanatomethyl)cyclohexane in an amount of not less than 50% by more relative to the total mole number of isocyanate groups.

8 Claims, No Drawings

(56) References Cited

FOREIGN PATENT DOCUMENTS

| | | | |
|---|---|---|---|
| JP | 07-309827 A | 11/1995 | |
| JP | 09-003154 A | 1/1997 | |
| JP | 11-310566 A | 11/1999 | |
| JP | 2003-089127 | 3/2003 | |
| JP | 2003-201331 | 7/2003 | |
| JP | 2003-212835 A | 7/2003 | |
| JP | 2003-292562 | 10/2003 | |
| JP | 2004-501997 A | 1/2004 | |
| JP | 2004-075701 | 3/2004 | |
| JP | 2004-150610 A | 5/2004 | |
| JP | 2004-169011 A | 6/2004 | |
| JP | 2004-224970 A | 8/2004 | |
| JP | 2004-244349 A | 9/2004 | |
| JP | 2005-096432 A | 4/2005 | |
| JP | 2005-126534 | 5/2005 | |
| JP | 2006-504843 A | 2/2006 | |
| JP | 2006-504849 A | 2/2006 | |
| JP | 03-911030 B2 | 2/2007 | |
| JP | 2007-091989 | 4/2007 | |
| WO | WO-02/00749 A2 | 1/2002 | |
| WO | WO-2004/041890 A1 | 5/2004 | |
| WO | WO-2006/040965 A1 | 4/2006 | |
| WO | WO-2009/051114 A1 | 4/2009 | |

OTHER PUBLICATIONS

Final Office Action U.S. Appl. No. 12/682,714 dated Jul. 25, 2012.
Final Office Action U.S. Appl. No. 12/682,858 dated Jul. 25, 2012.
Final Office Action U.S. Appl. No. 12/744,976 dated Sep. 1, 2011.
International Search Report mailed Dec. 22, 2008 received in PCT/JP2008/068577.
International Search Report mailed Dec. 22, 2008 received in PCT/JP2008/068599.
Non-Final Office Action U.S. Appl. No. 12/682,714 dated May 17, 2012.
Non-Final Office Action U.S. Appl. No. 12/682,858 dated Jan. 10, 2012.
Non-Final Office Action U.S. Appl. No. 12/682,858 dated Mar. 5, 2013.
Notification of Reasons for Refusal issued Jun. 12, 2013, JPA 2009-538090.
Notification of Reasons for Refusals for Japanese Patent Application No. 2009-541083 dated Jul. 23, 2013.
Office Action Chinese Application No. 200880111417.8 dated Jul. 20, 2012.
Office Action in U.S. Appl. No. 12/744,976 dated Apr. 28, 2011.
Office Action in U.S. Appl. No. 12/682,714 dated Feb. 16, 2011.
Office Action in U.S. Appl. No. 12/682,858 dated Mar. 19, 2012.
S. Yamasaki et al., "Effects of aggregation structure on rheological properties of thermoplastic polyurethanes", Polymer, vol. 48, (2007), pp. 4793-4803.
US Office Action on U.S. Appl. No. 12/682,714 dated Jan. 2, 2013.
Werner Blank Diol Tetramethylnene glycol graph of molecular weight v. Hydroxy number. Published Jul. 6, 2006.
Yu-Chin Lai et al., "Synthesis and Polymerization of Some New Bis-Triazolinediones: A Stability Study of 4-Substituted Triazolinediones", J. Macromol. Sci.-Chem, A22(10), 1985, pp. 1443-1461.
Office Action received in U.S. Appl. No. 13/965,471 dated Oct. 25, 2013.
Office Action received in U.S. Appl. No. 13/965,471 dated Mar. 12, 2014.

US 8,907,041 B2

GRANULAR POLYURETHANE RESIN COMPOSITION AND MOLDED ARTICLE OF THE SAME

CROSS REFERENCE TO RELATED APPLICATIONS

This application is a divisional application of U.S. application Ser. No. 12/682,858, filed on Oct. 14, 2008 which is now abandoned, which is a national stage application of PCT application no. PCT/JP2008/068577 filed on Oct. 14, 2008, which claims priority to Japanese patent application no. 2007-268013, filed on Oct. 15, 2007, the content of each of which is incorporated herein in its entirety by reference.

TECHNICAL FIELD

The present invention relates to a granular polyurethane resin composition and a molded article thereof. More particularly, the present invention relates to a granular polyurethane resin composition suitable for slush molding, and a molded article formed from the granular polyurethane resin composition.

BACKGROUND ART

Slush molding can easily form complex-shaped products, provide uniform thickness, and achieve a good material yield, so that slush molding is widely used for forming of automobile interior trim articles or the like.

Soft polyvinyl chloride-based powders have been used for slush molding materials for years. However, a plasticizer having a temperature below the freezing point can impair the feel of the molded article, and a skin shrinkage occurs due to time-elapsing escape of the plasticizer, resulting in a greater dimensional change. For this reason, the use of polyurethane resin-based powders in place of the soft polyvinyl chloride-based powders has been variously studied.

There has been proposed, for example, a powder composition for slush molding contains core-shell particles having a core layer formed from a thermoplastic polyurethane resin and a shell layer formed from a polymer of a vinyl monomer which is made by mixing an aqueous dispersion of a vinyl monomer with an aqueous dispersion of a thermoplastic polyurethane and then polymerizing the vinyl monomer and a shell layer formed by a polymer of a vinyl monomer (see, for example, the following Patent Document 1).
Patent Document 1: Japanese Unexamined Patent Publication No. 2005-96432

DISCLOSURE OF THE INVENTION

Problems to be Solved

However, there is a need for automobile interior trim articles to have better texture, design, and long-term heat resistance.

It is an object of the present invention to provide a granular polyurethane resin composition capable of producing a molded article having excellent texture, design, and long-term heat resistance with good production efficiency by slush molding, and a molded article formed from the granular polyurethane resin composition.

Means for Solving the Problem

To achieve the above object, the granular polyurethane resin composition of the present invention includes a thermoplastic polyurethane resin containing a hard segment formed by a reaction between a polyisocyanate containing isocyanate groups of 1,4-bis(isocyanatomethyl)cyclohexane in a proportion of not less than 50% by mole relative to the total mole number of isocyanate groups, and a chain extender.

It is preferable that the granular polyurethane resin of the present invention has a solidification temperature, determined by a differential scanning calorimeter, of 0 to 140° C.

It is preferable that the granular polyurethane resin of the present invention has a flow start temperature, determined by a flow tester, of 100 to 180° C.

It is preferable that the granular polyurethane resin of the present invention further includes a thermally crosslinkable monomer.

It is preferable that the granular polyurethane resin of the present invention includes a polymerization inhibitor in an amount of 0.1 to 6 parts by mass relative to 100 parts by mass of the thermally crosslinkable monomer.

In the granular polyurethane resin of the present invention, it is preferable that the thermoplastic polyurethane resin includes a vinyl monomer-modified polyol obtained by a reaction between a high-molecular-weight polyol and a vinyl monomer.

It is preferable that the granular polyurethane resin of the present invention is used for slush molding.

The molded article of the present invention is obtained by slush molding the above-mentioned granular polyurethane resin composition.

It is preferable that the molded article of the present invention is an automobile interior trim article.

Effect of the Invention

With the granular polyurethane resin composition of the present invention, a molded article having excellent fusibility during slush molding and releasability from the mold after the molding, and having excellent texture (feel), design, and long-term heat resistance can be produced by slush molding with good production efficiency. Therefore, the molded article of the present invention is excellent in texture (feel), design, and long-term heat resistance. Accordingly, the granular polyurethane resin composition and the molded article thereof according to the present invention are useful in various fields involving slush molding, for example, automobile interior trim articles.

EMBODIMENT OF THE INVENTION

The granular polyurethane resin composition of the present invention contains a thermoplastic polyurethane resin which contains a hard segment formed by a reaction between a polyisocyanate (hereinafter referred to as the above-mentioned polyisocyanate) which contains isocyanate groups of 1,4-bis(isocyanatomethyl)cyclohexane in a proportion of not less than 50% by mole relative to the total mole number of isocyanate groups, and a chain extender.

The thermoplastic polyurethane resin is not particularly limited as long as it contains the hard segment made of the above-mentioned polyisocyanate and the chain extender, and examples thereof include thermoplastic polyurethane resins synthesized by a reaction of the above-mentioned polyisocyanate, a high-molecular-weight polyol (i.e., macropolyol), and a chain extender.

In the thermoplastic polyurethane, a soft segment is formed by a reaction between the above-mentioned polyisocyanate and a high-molecular-weight polyol, and a hard segment is formed by a reaction between the above-mentioned polyisocyanate and a chain extender.

In the present invention, the above-mentioned polyisocyanate contains isocyanate groups of 1,4-bis(isocyanatomethyl)cyclohexane in a proportion of not less than 50% by mole, preferably not less than 70% by mole, more preferably not less than 80% by mole, even more preferably 90% by mole, relative to the total mole number of isocyanate groups. Most preferably, it contains 100% by mole of isocyanate groups thereof.

1,4-bis(isocyanatomethyl)cyclohexane includes stereoisomers of cis-1,4-bis(isocyanatomethyl)cyclohexane (hereinafter referred to as cis-1,4 isomer) and trans-1,4-bis(isocyanatomethyl)cyclohexane (hereinafter referred to as trans-1,4 isomer), and in the present invention, 1,4-bis(isocyanatomethyl)cyclohexane contains trans-1,4 isomers in a proportion of preferably not less than 50% by mole, more preferably 70% by mole, or even more preferably not less than 80% by mole. Most preferably, it contains 90% by mole of trans-1,4 isomers.

1,4-bis(isocyanatomethyl)cyclohexane can be produced, for example, by the cold/hot two-stage process (direct process) or the salt-forming process described in Japanese Unexamined Patent Publication No. 7-309827, or by the non-phosgenation process described in Japanese Unexamined Patent Publication No. 2004-244349 or No. 2003-212835.

Of the above-mentioned polyisocyanates, the polyisocyanate that can be used in combination with 1,4-bis(isocyanatomethyl)cyclohexane includes, for example, alicyclic diisocyanates such as 1,3-cyclopentane diisocyanate, 1,4-cyclohexane diisocyanate, 1,3-cyclohexane diisocyanate, 3-isocyanatomethyl-3,5,5-trimethyl cyclohexyl isocyanate, 4,4'-methylene-bis(cyclohexyl isocyanate), methyl-2,4-cyclohexane diisocyanate, methyl-2,6-cyclohexane diisocyanate, 1,3-bis(isocyanatomethyl)cyclohexane, 1,3-bis(isocyanatoethyl)cyclohexane, 1,4-bis(isocyanatoethyl)cyclohexane, and 2,5- or 2,6-bis(isocyanatomethyl)norbornane and mixtures thereof. Examples of such polyisocyanate also include aliphatic diisocyanates such as trimethylene diisocyanate, tetramethylene diisocyanate, pentamethylene diisocyanate, hexamethylene diisocyanate, 1,2-propylene diisocyanate, 1,2-butylene diisocyanate, 2,3-butylene diisocyanate, 1,3-butylene diisocyanate, 2,4,4- or 2,2,4-trimethyl hexamethylene diisocyanate, and 2,6-diisocyanato methyl caproate.

Further, monoisocyanate can also be used in combination as long as it does not impair the long-term heat resistance of molded articles. Examples of the monoisocyanate include methyl isocyanate, ethyl isocyanate, n-hexyl isocyanate, cyclohexyl isocyanate, 2-ethylhexyl isocyanate, phenyl isocyanate, and benzil isocyanate.

As the polyisocyanate that can be used in combination with 1,4-bis(isocyanatomethyl)cyclohexane, 3-isocyanatomethyl-3,5,5-trimethyl cyclohexyl isocyanate, 4,4'-methylene-bis(cyclohexyl isocyanate), 1,4-cyclohexane diisocyanate, 1,3-bis(isocyanatomethyl)cyclohexane, 2,5- or 2,6-bis(isocyanatomethyl)norbornane and mixtures thereof, and hexamethylene diisocyanate are preferable.

1,3-bis(isocyanatomethyl)cyclohexane includes stereoisomers of cis-1,3-bis(isocyanatomethyl)cyclohexane (hereinafter referred to as cis-1,3 isomer) and trans-1,3-bis(isocyanatomethyl)cyclohexane (hereinafter referred to as trans-1,3 isomer), and when 1,3-bis(isocyanatomethyl)cyclohexane is used in combination with 1,4-bis(isocyanatomethyl)cyclohexane, 1,3-bis(isocyanatomethyl)cyclohexane contains trans-1,3 isomers in a proportion of preferably not less than 50% by mole, more preferably 70% by mole, or even more preferably not less than 90% by mole.

In the present invention, the high-molecular-weight polyol is a compound having two or more hydroxyl groups and a number average molecular weight of 400 or more, and examples thereof include polyether polyol, polyester polyol, polycarbonate polyol, and vinyl monomer-modified polyol.

The high-molecular-weight polyol has a number average molecular weight of, for example, 400 to 5000, preferably 1400 to 3000, or more preferably 1500 to 2500, and a hydroxyl value of, for example, 10 to 125 mg KOH/g.

Examples of the polyether polyol include polypropylene glycol and polytetramethylene ether glycol.

Examples of the polypropylene glycol include addition polymers of alkylene oxide (including a random and/or block copolymer of two or more kinds of alkylene oxide), such as ethylene oxide and propylene oxide, using a low-molecular-weight polyol or a low-molecular-weight polyamine as an initiator.

The low-molecular-weight polyol is a compound having two or more hydroxyl groups and having a number average molecular weight of 60 to less than 400, and examples thereof include dihydric alcohols such as ethylene glycol, propanediol, 1,4-butylene glycol, 1,3-butylene glycol, 1,2-butylene glycol, 1,6-hexandiol, neopentyl glycol, alkane (7-22) diol, diethylene glycol, triethylene glycol, dipropylene glycol, 1,3- or 1,4-cyclohexane dimethanol and mixtures thereof, 1,4-cyclohexanediol, alkane-1,2-diol (C17-20), hydrogenated bisphenol-A, 1,4-dihydroxy-2-butene, 2,6-dimethyl-1-octene-3,8-diol, and bisphenol A; trihydric alcohols such as glycerol and trimethylolpropane; and polyhydric alcohols having four or more hydroxyl groups such as tetramethylolmethane, pentaerythritol, dipentaerythritol, D-sorbitol, xylitol, D-mannitol, and D-mannite.

Examples of the low-molecular-weight polyamine include aliphatic diamine such as ethylenediamine; and aromatic diamine such as tolylenediamine.

Examples of the polytetramethylene ether glycol include a ring-opening polymerization product obtained by cationic polymerization of tetrahydrofuran, and amorphous polytetramethylene ether glycol obtained by copolymerizing the above-mentioned dihydric alcohol with a polymerization unit of tetrahydrofuran.

Examples of the polyester polyol include a polycondensation product obtained by allowing the above-mentioned dihydric alcohol and a polybasic acid to react under known conditions.

Examples of the polybasic acid include carboxylic acids such as oxalic acid, malonic acid, succinic acid, methylsuccinic acid, glutaric acid, adipic acid, 1,1-dimethyl-1,3-dicarboxypropane, 3-methyl-3-ethyl glutaric acid, azelaic acid, sebacic acid, and other aliphatic dicarboxylic acids (of 11 to 13 carbon atoms), hydrogenated dimer acid, maleic acid, fumaric acid, itaconic acid, orthophthalic acid, isophthalic acid, terephthalic acid, toluene dicarboxylic acid, dimer acid, and HET acid; and acid anhydrides and acid halides derived from these carboxylic acids.

Examples of the polyester polyol include polycaprolactone polyol and polyvalerolactone polyol, which are obtained by ring-opening polymerization of lactones, such as ε-caprolactone and γ-valerolactone, using the above-mentioned dihydric alcohol as an initiator; and lactone-based polyester polyol obtained by copolymerizing these polyols with the above-mentioned dihydric alcohol.

Examples of the polycarbonate polyol include a ring-opening polymerization product of ethylene carbonate using the above-mentioned dihydric alcohol as an initiator; and amorphous polycarbonate polyol obtained by copolymerizing a ring-opening polymerization product and dihydric alcohol such as 1,4-butanediol, 1,5-pentanediol, or 1,6-hexandiol.

The vinyl monomer-modified polyol can be obtained by a reaction between the above-mentioned high-molecular-weight polyol and a vinyl monomer. Containing of the vinyl monomer-modified polyol as a high-molecular-weight polyol allows molded articles to have improved light resistance and a moist texture. Further, in the production process, preparation of the thermoplastic polyurethane resin as a dispersion to be described later can prevent adhesion to a production equipment.

Among the above-mentioned high-molecular-weight polyols, a high-molecular-weight polyol which does not contain a carbon-carbon double bond (high-molecular-weight polyol selected from polyether polyol, polyester polyol, and polycarbonate polyol) is preferable, or a polyester polyol which does not contain a carbon-carbon double bond is more preferable.

Examples of the vinyl monomer include alkyl (meth)acrylate such as ethyl acrylate, propyl acrylate, butyl acrylate, cyclohexyl acrylate, isononyl acrylate, 2-ethylhexyl acrylate, methyl methacrylate, butyl methacrylate, cyclohexyl methacrylate, and 2-ethylhexyl methacrylate; and vinyl cyanide or vinylidene cyanide such as acrylonitrile and methacrylonitrile. These vinyl monomers can be used alone or in combination of two or more kinds. Among them, alkyl (meth)acrylate is preferable. Preferably, more than 50% by mass of alkyl (meth)acrylate is contained in the vinyl monomer.

The above-mentioned high-molecular-weight polyol and the vinyl monomer are allowed to react, for example, by blending a vinyl monomer in an amount of, for example, 2 to 50 parts by mass, preferably, 5 to 30 parts by mass, or more preferably 10 to 30 parts by mass, per 100 parts by mass of the above-mentioned high-molecular-weight polyol, and adding a radical polymerization initiator thereto.

The radical polymerization initiator that may be used includes, for example, persulfate, organic peroxide, and azo compound.

Examples of the persulfate include sodium persulfate, potassium persulfate, and ammonium persulfate.

Examples of the organic peroxide include peroxy ketals such as 1,1-di(t-hexylperoxy)cyclohexane, 1,1-di(t-hexylperoxy)-3,3,5-trimethylcyclohexane, 1,1-di(t-butylperoxy)cyclohexane, n-butyl-4,4-di(t-butylperoxy)valerate, 2,2-di(t-butylperoxy)butane, 1,1-di(t-butylperoxy)-2-methylcyclohexane, 1,1-di(t-butylperoxy)-3,3,5-trimethylcyclohexane, and 2,2-di(4,4-dibutylperoxycyclohexyl)propane; dialkyl peroxides such as di-t-butyl peroxide; diacyl peroxides such as dilauroyl peroxide, di-(3-methylbenzoyl)peroxide, benzoyl(3-methylbenzoyl)peroxide, and dibenzoyl peroxide; and peroxyesters such as 1,1,3,3-tetramethylbutyl peroxy-2-ethylhexanoate, 2,5-dimethyl-2,5-di(2-ethylhexanoylperoxy)hexane, t-hexyl peroxy-2-ethylhexanoate, t-butyl peroxy-2-ethylhexanoate, t-hexyl peroxy isopropyl monocarbonate, t-butyl peroxy laurylate, t-butyl peroxy isopropyl monocarbonate, t-butyl peroxy-2-ethylhexyl monocarbonate, and 2,5-dimethyl-2,5-di(benzoylperoxy)hexane.

Examples of the azo compound include azobis(isobutyronitrile), 2,2'-azobis(2,4-dimethylvaleronitrile), 2,2'-azobis(2-methylbutyronitrile), dimethyl 2,2'-azobis(2-methylpropionate), 2,2'-azobis[(2-(2-imidazoline-2-yl)propane], dimethyl methylpropaneisobutyrate,2,2,7-azobis[N-(2-carboxyl)-2-methylpropioneamidine]tetrahydrate,2,2'-azobis[2-methyl-N-[1,1-bis(hydroxymethyl)-2-hydroxyethyl]propionamide], 2,2'-azobis[N-(2-hydroxyethyl)-2-methylpropanamide], 2,2'-azobis(2,4-dimethyl-4-methoxyvaleronitrile), and 1,1'-azobis[cyclohexane-1-carbonitrile].

These radical polymerization initiators can be used alone or in combination of two or more kinds. Among them, organic peroxides are preferable, or peroxyketals are more preferable.

The radical polymerization initiator is added in an amount of, for example, 3 to 10 parts by mass, or preferably 4 to 9 parts by mass, per 100 parts by mass of the high-molecular-weight polyol.

In this reaction, for example, the monomer solution obtained by mixing the vinyl monomer and the radical polymerization initiator is added dropwise to the high-molecular-weight polyol under an inert gas atmosphere, and the mixture is allowed to react, for example, at a reaction temperature of 80 to 160° C., or preferably 100 to 140° C. for a reaction time of 1 to 10 hours, or preferably 2 to 8 hours.

A vinyl monomer-modified polyol can be obtained by the above reaction. The vinyl monomer-modified polyol has a number average molecular weight of, for example, 900 to 5000, or preferably 1000 to 3000, and a hydroxyl value of, for example, 20 to 80 mg KOH/g.

Further, in the synthesis of the thermoplastic polyurethane resin, the above-mentioned low-molecular-weight polyol, a monol, and/or a monoamine can be used in combination with the high-molecular-weight polyol.

Examples of the monol include methanol, ethanol, propanol, butanol, 2-ethylhexyl alcohol, other alkanols (C5-38) and aliphatic unsaturated alcohol (9-24), alkenyl alcohol, 2-propen-1-ol, alkadienol (C6-8), and 3,7-dimethyl-1,6-octadien-3-ol.

Examples of the monoamine include dimethylamine, diethylamine, di-n-propylamine, diisopropylamine, di-n-butylamine, diisobutylamine, di-t-butylamine, dihexylamine, 2-ethylhexylamine, 3-methoxypropylamine, 3-ethoxypropylamine, 3-(2-ethylhexyloxypropylamine), 3-(dodecyloxy) propylamine, N,N-dimethyl 1,3-propanediamine, and morpholine.

The monol and/or monoamine is/are blended as required in order to adjust the molecular weight of the thermoplastic polyurethane resin.

In the present invention, examples of the chain extender include low-molecular-weight polyols such as the above-mentioned dihydric alcohols and the above-mentioned trihydric alcohols; and diamine such as alicyclic diamine and aliphatic diamine.

Examples of the alicyclic diamine include 1-amino-3-aminomethyl-3,5,5-trimethylcyclohexane, bis-(4-aminocyclohexyl)methane, diaminocyclohexane, 3,9-bis(3-aminopropyl)-2,4,8,10-tetraoxaspiro[5,5]undecane, 1,3- and 1,4-bis (aminomethyl)cyclohexane and mixtures thereof.

Examples of the aliphatic diamine include ethylenediamine, propylenediamine, hexamethylenediamine, hydrazine, 1,2-diaminoethane, 1,2-diaminopropane, and 1,3-diaminopentane.

These chain extenders can be used alone or in combination of two or more kinds. Among them, the above-mentioned dihydric alcohols are preferable, or ethylene glycol, 1,3-propanediol, 1,4-butanediol, and 1,6-hexamethylene glycol are more preferable.

The thermoplastic polyurethane resin can be synthesized with each of the above-mentioned components (i.e., the above-mentioned polyisocyanate, the high-molecular-weight polyol, and the chain extender as essential components, and the low-molecular-weight polyol, the monol, and the monoamine as optional components) by a known synthesizing process such as one-shot process and prepolymer process.

Preferably, the thermoplastic polyurethane resin is synthesized by the prepolymer process.

In the one-shot process, the above-mentioned components are allowed to react by simultaneously blending the above-mentioned polyisocyanate and the other components (the high-molecular-weight polyol and the chain extender, and as optional components, the low-molecular-weight polyol, the monol, and the monoamine) such a ratio that the equivalent ratio of the isocyanate group in the above-mentioned polyisocyanate to the active hydrogen group (hydroxyl group and amino group) in the other components is in the range of, for example, 0.8 to 1.1, or preferably 0.9 to 1.05.

This reaction is continued, for example, at a reaction temperature of 40 to 260° C., or preferably 80 to 220° C. for a reaction time of 0.5 to 10 hours, or preferably 2 to 8 hours under a nitrogen atmosphere.

In the reaction, if necessary, a catalyst such as amines or organometallic compounds, or a solvent can be added.

As the catalyst, an organometallic compound is preferable, and examples of the organometallic compound include tin acetate, tin octylate, tin oleate, tin laurate, dibutyl tin diacetate, dimethyl tin dilaurate, dibutyl tin dilaurate, dioctyl tin dilaurylate, dibutyl tin dichloride, lead octanoate, lead naphthenate, nickel naphthenate, cobalt naphthenate, octenate copper, and bismuth-based catalyst.

These catalysts can be used alone or in combination of two or more kinds, and the catalyst is added in an amount of, for example, 0.001 to 5 parts by mass, or preferably 0.01 to 3 parts by mass, per 100 parts by mass of the high-molecular-weight polyol.

Examples of the solvent include aliphatic hydrocarbons and alicyclic hydrocarbons such as hexane, heptane, octane, pentane, and cyclohexane; esters including alkyl esters such as methyl acetate, ethyl acetate, n-butyl acetate, isobutyl acetate, and amyl acetate, and ether esters such as ethylene glycol monomethyl ether acetate, ethylene glycol monoethyl ether acetate, ethylene glycol mono-n-butyl ether acetate, and ethyl ethoxy propionate; ketones such as acetone, methyl ethyl ketone, methyl isobutyl ketone, methyl amyl ketone, and cyclohexanone; and aromatic hydrocarbons such as toluene, xylene, and ethylbenzene.

These solvents can be used alone or in combination of two or more kinds, and are blended at an appropriate ratio according to the viscosity of the reaction system or the like.

Then, in the one-shot process, the thermoplastic polyurethane resin thus obtained is, if necessary, crushed by a known method and thereafter, a freeze crushing method is performed to produce the granular polyurethane resin composition of the present invention in the form of powder. Even in the one-shot process, a vinyl monomer polymer, a thermally crosslinkable monomer, a polymerization inhibitor and a known additive, which are described later, can be appropriately blended by kneading or other means, so that the granular polyurethane resin composition of the present invention can be obtained in the form of powder.

In the prepolymer method, first, the above-mentioned polyisocyanate and the components other than the chain extender (i.e., the above-mentioned polyisocyanate and the high-molecular-weight polyol as essential components, and the low-molecular-weight polyol, the monol, and the monoamine as optional components) are allowed to react to synthesize an isocyanate group-terminated prepolymer, and the isocyanate group-terminated prepolymer and the chain extender are then allowed to react.

The isocyanate group-terminated prepolymer is synthesized in the following manner. The above-mentioned polyisocyanate, the high-molecular-weight polyol, and if necessary, the low-molecular-weight polyol, the monol, and the monoamine are allowed to react by blending them at such a ratio that the equivalent ratio (isocyanate group/active hydrogen group) of the isocyanate group in the above-mentioned polyisocyanate to the active hydrogen group (hydroxyl group and amino group) in the high-molecular-weight polyol, the low-molecular-weight polyol, the monol, and the monoamine is in the range of, for example, 1.1 to 4, or preferably 1.4 to 2.5.

When the above equivalent ratio is less than 1.1, the thermoplastic polyurethane resin has excessively high molecular weight, which may deteriorate moldability. On the other hand, when it exceeds 4, the molded article may become hard, which may impair the texture.

This reaction is continued, for example, at a reaction temperature of 40 to 180° C., or preferably 60 to 140° C. for a reaction time of 0.5 to 10 hours, or preferably 2 to 8 hours under a nitrogen atmosphere, and the reaction is terminated at the time when a desired isocyanate group content (e.g., 1 to 12% by weight) is obtained in the reaction system. In the reaction, if necessary, the above-mentioned catalyst or solvent can also be added.

Subsequently, the isocyanate group-terminated prepolymer and the chain extender are blended at such a ratio that the equivalent ratio (active hydrogen group/isocyanate group) of the active hydrogen group (amino group and hydrogen group) in the chain extender to the isocyanate group in the isocyanate group-terminated prepolymer is in the range of, for example, 0.8 to 1.1, or preferably 0.9 to 1.05, and the blended mixture is subjected to chain extension reaction, so that a thermoplastic polyurethane resin is produced.

In the chain extension reaction, for example, the isocyanate group-terminated prepolymer is dispersed in a non-aqueous dispersion medium or an aqueous dispersion medium to prepare a dispersion of the isocyanate group-terminated prepolymer, and a chain extender is added at once or in portions to the dispersion.

Examples of the non-aqueous dispersion medium include the above-mentioned solvents, and examples of the aqueous dispersion include water, or mixed solutions of water and alcohols (e.g., methanol, ethanol, etc.).

The blending amount of the non-aqueous dispersion medium or the aqueous dispersion medium is in the range of, for example, 10 to 200 parts by mass, or preferably 20 to 150 parts by mass, per 100 parts by mass of the isocyanate group-terminated prepolymer.

An emulsifier, for example, a nonionic surfactant such as polyoxyethylene alkyl ether, or an anionic surfactant such as sodium polyoxyethylene alkyl ether sulfate can also be added to the dispersion.

Further, a dispersion stabilizer can be added to the dispersion in order to prevent the sedimentation of the dispersed phase. Examples of the dispersion stabilizer include dispersing agents described in Japanese Unexamined Patent Publication No. 2004-169011, such as resin obtained by dehydration condensation of an alkenyl succinic anhydride and a polyol or a polyester polyol; alkyd resin obtained by dehydration condensation of a part of the remaining OH groups of the polyester, which is obtained by dehydration condensation of dicarboxylic acid and pentaerythritol, with fatty acids; resin obtained by grafting an ethylenically unsaturated monomer onto a polyol obtained by dehydration condensation of an unsaturated bond-containing dicarboxylic acid and a polyol or a polyester polyol, and thereafter masking an OH group; and resin obtained by masking an OH group of a polyol obtained by dehydration condensation of an unsaturated bond-containing dicarboxylic acid and a polyol or a polyester polyol, and thereafter grafting an ethylenically unsaturated monomer.

The blending amount of the emulsifier or the dispersion stabilizer is in the range of, for example, 0.05 to 5 parts by mass, preferably 0.1 to 3 parts by mass, or more preferably 0.15 to 1.5 parts by mass, per 100 parts by mass of the isocyanate group-terminated prepolymer.

The chain extension reaction is performed, for example, at a reaction temperature of 10 to 100° C., or preferably 20 to 90° C. for a reaction time of 0.5 to 8 hours, or preferably 2 to 6 hours. In the reaction, if necessary, the above-mentioned catalyst can be added.

Thus, the thermoplastic polyurethane resin can be obtained as a dispersion.

In the chain extension reaction, without dispersing the isocyanate group-terminated prepolymer in the non-aqueous dispersion medium or the aqueous dispersion medium, the isocyanate group-terminated prepolymer and the chain extender can be allowed to react directly with each other.

The thermoplastic polyurethane resin thus obtained has a concentration of the hard segment formed by the reaction between the above-mentioned polyisocyanate and the chain extender in the range of preferably 4 to 20% by mass, or more preferably 5 to 15% by mass. When the hard segment concentration of the thermoplastic polyurethane resin is within the above-mentioned range, mold releasability and fusibility can be balanced.

The hard segment concentration can be calculated, for example, from the blending formulation (preparation) of each of the components by the following equation:

[Chain extender (g)+(chain extender (g)/molecular weight of chain extender (g/mol)×average molecular weight of polyisocyanate (g/mol)]/(high-molecular-weight polyol (g)+polyisocyanate (g)+chain extender (g)+optional component (low-molecular-weight polyol (g)+monol (g)+monoamine (g)))×100

Alternatively, the hard segment concentration can be actually measured, for example, by solid NMR or solution NMR of the composition for slush molding. The specific measurement method is described in, for example, Satoshi Yamasaki et. al, "Effect of aggregation structure on rheological properties of thermoplastic polyurethanes," Polymer, 48 vol., pp. 4793-4803, 2007.

The granular polyurethane resin composition of the present invention can contain, a vinyl monomer polymer, a thermally crosslinkable monomer, a polymerization inhibitor, or the like according to the purposes and applications, as well as the thermoplastic polyurethane resin.

In the present invention, the vinyl monomer polymer is, for example, a copolymer of an aromatic vinyl monomer and α,β-ethylenically unsaturated carboxylic acid alkyl ester, and can be obtained by subjecting the aromatic vinyl monomer and the α,β-ethylenically unsaturated carboxylic acid alkyl ester to a radical copolymerization reaction.

Examples of the aromatic vinyl monomer include styrene-based monomers such as styrene and α-methylstyrene; alkyl vinylbenzene such as vinyltoluene and ethylvinylbenzene; and polycyclic aromatic monovinyl monomers such as vinylnaphthalene.

These aromatic vinyl monomers can be used alone or in combination of two or more kinds. Among them, styrene is preferable.

Examples of the α,β-ethylenically unsaturated carboxylic acid alkyl ester include acrylate, and examples of the acrylate include alkyl (meth)acrylate such as ethyl acrylate, propyl acrylate, butyl acrylate, cyclohexyl acrylate, isononyl acrylate, 2-ethylhexyl acrylate, methyl methacrylate, butyl methacrylate, cyclohexyl methacrylate, and 2-ethylhexyl methacrylate. Examples of the α,β-ethylenically unsaturated carboxylic acid alkyl ester further include vinyl cyanides or vinylidene cyanides such as acrylonitrile and methacrylonitrile.

These α,β-ethylenically unsaturated carboxylic acid alkyl esters can be used alone or in combination of two or more kinds. Among them, methyl methacrylate and butyl methacrylate are preferable.

The aromatic vinyl monomer and the α,β-ethylenically unsaturated carboxylic acid alkyl ester are subjected to a radical copolymerization reaction in the following manner. The aromatic vinyl monomer in a proportion of 35 to 70% by mass, or preferably 45 to 65% by mass and the α,β-ethylenically unsaturated carboxylic acid alkyl ester in a proportion of 30 to 65% by mass, or preferably 35 to 55% by mass, are blended with respect to the total amount of their vinyl monomers and a radical polymerization initiator is added thereto to radically copolymerize the mixture.

Examples of the radical polymerization initiator include those radical polymerization initiators mentioned above. The radical polymerization initiator is added in an amount of, for example, 0.1 to 10 parts by mass, or preferably 1 to 7 parts by mass, per 100 parts by mass of the total amount of vinyl monomers.

In the radical copolymerization reaction, if necessary, chain transfer agents, for example, mercaptans such as t-dodecyl mercaptan and 2-ethylhexyl thioglycolate; or styrene dimers such as α-methylstyrene dimer can also be added. The chain transfer agent is added in an amount of, for example, 0 to 10 parts by mass, preferably 0.01 to 5 parts by mass, or more preferably 0.01 to 2 parts by mass, per 100 parts by mass of the total amount of vinyl monomers.

In the radical copolymerization reaction, the vinyl monomer is allowed to react, for example, at a reaction temperature of 20 to 150° C., or preferably 30 to 120° C. for a reaction time of 1 to 20 hours, or preferably 2 to 15 hours.

The vinyl monomer polymer is synthesized on the above-mentioned conditions separately from the thermoplastic polyurethane resin, and the synthesized product can be blended with the thermoplastic polyurethane resin or a dispersion thereof. The vinyl monomer polymer can be synthesized in the following manner. A vinyl monomer, a radical polymerization initiator, and, if necessary, a chain transfer agent (if necessary, as a monomer liquid preliminarily mixed therewith) are blended with an isocyanate group-terminated prepolymer or a thermoplastic polyurethane resin, or a dispersion thereof, so that the vinyl monomer polymer can be synthesized in the dispersion on the above-conditions.

The vinyl monomer polymer is blended in an amount of, for example, 5 to 40 parts by mass, preferably 6 to 30 parts by mass, or more preferably 6 to 20 parts by mass, per 100 parts by mass of the thermoplastic polyurethane resin.

In the present invention, the thermally crosslinkable monomer is a compound having a plurality of ethylenically unsaturated bonds, and examples thereof include alkanediol di(meth)acrylate such as ethylene glycol di(meth)acrylate, propyleneglycol di(meth)acrylate, butylene glycol di(meth)acrylate, pentanediol di(meth)acrylate, neopentyl glycol di(meth)acrylate, hexanediol di(meth)acrylate, nonanediol di(meth)acrylate, and oligoethylene glycol di(meth)acrylate; alkane polyol poly(meth)acrylate such as trimethylolpropane tri(meth)acrylate, glycerol tri(meth)acrylate, pentaerythritol tetra(meth)acrylate, dipentaerythritol penta(meth)acrylate, and dipentaerythritol hexa(meth)acrylate; unsaturated carboxylic acid diallyl ester, such as diallyl maleate, diallyl fumarate, and diallyl itaconate; urethane di(meth)acrylate; and polybutadiene di(meth)acrylate. Among them, dipentaerythritol penta(meth)acrylate and dipentaerythritol hexa(meth)acrylate are preferable.

These thermally crosslinkable monomers can be used alone or in combination of two or more kinds. Among them, alkane polyol poly(meth)acrylate is preferable. The thermally crosslinkable monomer is blended in an amount of, for example, 1 to 10 parts by mass, or preferably 1 to 7 parts by mass, per 100 parts by mass of the thermoplastic polyurethane resin.

Specifically, the thermally crosslinkable monomer is blended with, for example, the thermoplastic polyurethane resin or a dispersion thereof.

In the present invention, examples of the polymerization inhibitor include quinones such as p-benzoquinone, p-methoquinone, naphthoquinone, phenanthraquinone, toluquinone, and 2,5-diphenyl-p-benzoquinone; hydroquinones such as hydroquinone, p-t-butylcatechol, 2,5-di-t-butylhydroquinone, mono-t-butylhydroquinone, and 2,5-di-t-amyl hydroquinone; and phenols such as p-methoxy phenol and di-t-butyl paracresol hydroquinone monomethyl ether.

These polymerization inhibitors can be used alone or in combination of two or more kinds. Among them, hydroquinone and p-methoxy phenol are preferable. The polymerization inhibitor is blended in an amount of, for example, 0.1 to 6 parts by mass, preferably 0.1 to 5 parts by mass, or more preferably 0.1 to 4 parts by mass, per 100 parts by mass of the thermally crosslinkable monomer.

When the number of parts by mass of the polymerization inhibitor is less than 0.1 parts by mass, color irregularity, feel, and further long-term heat resistance may deteriorate. On the other hand, when it exceeds 6 parts by mass, color irregularity, mechanical strength, and long-term heat resistance may deteriorate.

Specifically, the polymerization inhibitor is blended with, for example, the thermoplastic polyurethane resin or a dispersion thereof.

As for the granular polyurethane resin composition of the present invention, when the dispersion is prepared from a non-aqueous dispersion medium, for example, solids are separated, for example, by separating means such as filtration to obtain a granular polyurethane resin composition in the form of powder. On the other hand, when the dispersion is prepared from an aqueous dispersion medium, for example, solids are separated, for example, by spray drying to obtain a granular polyurethane resin composition in the form of powder. Further, when the isocyanate group-terminated prepolymer and the chain extender are allowed to react directly with each other without dispersing in a non-aqueous dispersion medium or an aqueous dispersion medium, a granular polyurethane resin composition is obtained in the form of powder, for example, by a freeze crushing method.

Other known additives such as plasticizer, antiblocking agent, heat-resistant stabilizer, light-resistant stabilizer, releasing agent, or further, antioxidant, ultraviolet absorber, pigment, dye, lubricant, filler, or hydrolysis inhibitor can optionally be added to the granular polyurethane resin of the present invention. These additives may be added during synthesis of each component or may be added during mixing and dissolving of each of the components, and further, they can also be added after separation and drying of the granular polyurethane resin of the present invention.

The granular polyurethane resin of the present invention has a volume-average particle size of, for example, 50 to 300 μm, or preferably 80 to 200 μm. When the volume-average particle size thereof is less than 50 μm, irregularities may occur during molding due to deterioration in powder flowability. On the other hand, when the volume-average particle size exceeds 300 μm, pinholes may be formed in a surface of the molded article.

The granular polyurethane resin composition of the present invention has a solidification temperature, which is determined by a differential scanning calorimeter, of, for example, 0 to 140° C., preferably 10 to 120° C., or more preferably 20 to 110° C. When the solidification temperature is within the above-mentioned range, the aggregation of the hard segment in a cooling process is high, achieving improvement in mold releasability and shape retention of the molded article required for slush molding. Specifically, the solidification temperature can be determined by the method to be described later in Examples.

The granular polyurethane resin composition of the present invention has a flow start temperature, which is determined by a flow tester, of, for example, 100 to 180° C., preferably 100 to 170° C., or more preferably 110 to 160° C. When the flow start temperature is within the above-mentioned range, the fusibility required for slush molding can be improved. Specifically, the flow start temperature can be determined by the method to be described later in Examples.

With the granular polyurethane resin composition of the present invention, a molded article having excellent fusibility during slush molding and releasability from the mold after the molding, and having excellent texture (feel), design, and long-term heat resistance can be produced by slush molding with good production efficiency. Therefore, the molded article of the present invention is excellent in texture (feel), design, and long-term heat resistance. Accordingly, the granular polyurethane resin composition and the molded article thereof according to the present invention are useful in various fields involving slush molding, for example, furniture such as sofas and bedding; toys; sporting goods; and toner binders, and are particularly useful in automobile interior trim articles. The granular polyurethane resin composition of the present invention is also useful in fields other than those involving slush molding, for example, toner binders.

EXAMPLES

While in the following, the present invention is described with reference to Preparation Examples, Examples, and Comparative Examples, the present invention is not limited to any of them.

Preparation Example 1

Preparation Method of 1,4-bis(isocyanatomethyl)cyclohexane)

As a raw material, 1,4-bis(aminomethyl)cyclohexane (manufactured by Mitsubishi Gas Chemical Company, Inc.) having a trans/cis ratio of 93/7 determined by $^{13}$C-NMR was used to perform cold/hot two-stage phosgenation method under normal pressure.

Specifically, a stirring rod, a thermometer, a phosgene inlet tube, a dropping funnel, and a condenser tube were attached to a flask, and the flask was charged with 400 parts by mass of ortho dichlorobenzene. While the flask was cooled with cold water, the temperature in the flask was lowered to 10° C. or below, and 280 parts by mass of phosgene was introduced thereinto from the phosgene inlet tube. The dropping funnel was charged with a mixed solution of 100 parts by mass of 1,4-bis(aminomethyl)cyclohexane and 500 parts by mass of ortho dichlorobenzene, and the mixed solution was added into the flask over 30 minutes. During this time, the temperature in the flask was maintained at 30° C. or below. After completion of the addition, a white slurry-like liquid was formed in the flask. Again, the reaction temperature was increased to 150° C. with introducing phosgene, and the reaction was continued at 150° C. for 5 hours. The reaction solution in the flask became a pale-brown transparent liquid.

After completion of the reaction, nitrogen gas was introduced at a temperature of 100 to 150° C. at a flow rate of 10 L/hour for degassing.

The ortho dichlorobenzene solvent was distilled away under reduced pressure and a fraction having a boiling point of 138 to 140° C./0.7 KPa was further sampled by vacuum distillation.

Thus, 123 parts by mass (90% yield) of 1,4-bis(isocyanatomethyl)cyclohexane was obtained in the form of a colorless and transparent liquid.

The resulting 1,4-bis(isocyanatomethyl)cyclohexane had a purity, which was determined by gas chromatography, of 99.9%, a hue of 5 in APHA, and a trans/cis ratio, which was determined by $^{13}$C-NMR, of 93/7.

Preparation Example 2

Preparation Method of Dispersion Stabilizer (I)

A three-neck flask equipped with a stirrer was charged with 2000 parts by mass of adipate polyester polyol (manufactured by MITSUI CHEMICALS POLYURETHANES, INC., trade name: U-2610) and 98 parts by mass of maleic anhydride. The mixture was then gradually heated under a nitrogen flow and was thereafter stirred at 150° C. for 20 hours. Further, the mixture was gradually heated to 170° C. under a reduced pressure of 2.66 kPa with nitrogen bubbling, and stirred at that temperature for 5 hours, to obtain an unsaturated bond-containing polyol.

After the temperature was increased to 70° C. under a nitrogen atmosphere, 200 parts by mass of ethyl isocyanate was gradually added dropwise to 1300 parts by mass of the unsaturated bond-containing polyol. The mixture was then allowed to react at a temperature of 75 to 80° C. for 6 hours to synthesize an unsaturated bond-containing compound having a urethane bond at the end of the molecule.

Next, the unsaturated bond-containing compound was subjected to reduced pressure treatment on the conditions of 130° C. and 0.66 kPa or less. Further, 11547 parts by mass of butyl acetate was added to 6077 parts by mass of the unsaturated bond-containing compound to prepare a uniform solution. Thereafter, the atmosphere was fully replaced with nitrogen and the solution was heated to 110° C.

A monomer solution obtained by preliminarily mixing 21270 parts by mass of lauryl methacrylate and 1100 parts by mass of benzoyl peroxide was added dropwise at 110° C. for about 1 hour under a nitrogen atmosphere. The mixture was allowed to react at a temperature of 110 to 120° C. for 2 hours and then further allowed to react at 130° C. for 2 hours. As a result, a dispersion stabilizer (I) having a solid content of about 65% by mass was obtained.

Preparation Example 3

Preparation Method of Vinyl Monomer-Modified Polyol A

A reactor equipped with a stirrer, a dropping apparatus, and a condenser was charged with 315.5 parts by mass of adipate polyester polyol (manufactured by MITSUI CHEMICALS POLYURETHANES, INC., trade name: Takelac U-2024) having a number average molecular weight of 2000, which was preliminarily subjected to reduced pressure dehydration treatment, and the mixture was heated to 117° C. with stirring under a nitrogen atmosphere.

Subsequently, a monomer solution obtained by preliminarily mixing 63.11 parts by mass of n-butyl methacrylate (manufactured by Wako Pure Chemicals Industries, Ltd.) and 21.5 parts by mass of PERHEXA C (S) (manufactured by NOF Corporation, organic peroxide obtained by diluting 1,1-di(t-butylperoxy)cyclohexane with a hydrocarbon-based solvent so as to have a purity of 70%) under a nitrogen atmosphere was added dropwise at a temperature of 117 to 121° C. to the reactor maintaining at the above-mentioned temperature over about 4 hours.

Thereafter, the added mixture was aged to react at 120° C. for 4 hours, and the monomer was distilled off at a temperature of 115 to 125° C. with nitrogen bubbling under a reduced pressure of 1.33 kPa or less for about 5 hours until the distillate was no longer observed.

Thus, a vinyl monomer-modified polyol A having a hydroxyl value of 42.2 mg KOH/g and an acid value of 0.7 mg KOH/g was synthesized.

Example 1

A reaction vessel equipped with a nitrogen introducing tube, a thermometer, a condenser tube, and a stirrer was charged with 84.25 parts by mass of Takelac U-2024 (manufactured by MITSUI CHEMICALS POLYURETHANES, INC., number average molecular weight: 2000, adipate polyester polyol) as a high-molecular-weight polyol, 0.51 parts by mass of IRGANOX 245 (manufactured by Ciba Specialty Chemicals K. K.) as an antioxidant, 0.50 parts by mass of Tinuvin 213 (manufactured by Ciba Specialty Chemicals K. K.) as a benzotriazol type ultraviolet absorber, 0.49 parts by mass of Tinuvin 765 (manufactured by Ciba Specialty Chemicals K. K.) as a hindered amine light stabilizer, and 13.40 parts by mass of the 1,4-bis(isocyanatomethyl)cyclohexane (hereinafter abbreviated as 1,4-BIC) prepared in Preparation Example 1 as a polyisocyanate, and the mixture was heated to a temperature of 80 to 85° C. with thoroughly stirring.

Subsequently, the reaction vessel was charged at once with 0.2399 parts by mass of 2-ethylhexyl alcohol (manufactured by Wako Pure Chemicals Industries, Ltd., abbreviated as 2-EtOH) as a monol. After the reaction was continued for about 2 hours, it was confirmed that the isocyanate content had dropped to 1.98% by mass, so that an isocyanate group-terminated prepolymer was obtained.

Thereafter, the reaction vessel was charged at once with 0.4528 parts by mass of the dispersion stabilizer (I) and 68.57 parts by mass of n-heptane which were preliminarily mixed, and the isocyanate group-terminated prepolymer was dispersed over 1 hour.

Then, as a chain extender, 2.156 parts by mass of 1,4-butanediol (manufactured by Wako Pure Chemicals Industries, Ltd., abbreviated as 1,4-BD) was charged therein, and the mixture was thereafter allowed to react at that temperature for 5 hours, to obtain a dispersion of thermoplastic polyurethane resin.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin was colored.

Example 2

A reaction vessel equipped with a nitrogen introducing tube, a thermometer, a condenser tube, and a stirrer was charged with 81.61 parts by mass of Takelac U-2024 (manufactured by MITSUI CHEMICALS POLYURETHANES, INC., number average molecular weight: 2000, adipate polyester polyol) as a high-molecular-weight polyol, 0.51 parts by mass of IRGANOX 245 (manufactured by Ciba Specialty Chemicals K. K.) as an antioxidant, 0.49 parts by mass of Tinuvin 213 (manufactured by Ciba Specialty Chemicals K. K.) as a benzotriazol type ultraviolet absorber, 0.49 parts by mass of Tinuvin 765 (manufactured by Ciba Specialty Chemicals K. K.) as a hindered amine light stabilizer, 13.21 parts by mass of 1,4-BIC as a polyisocyanate, and 1.99 parts by mass of 4,4'-methylenebis(cyclohexylisocyanate) (manufactured by Sumika Bayer Urethane Co., Ltd., trade name: Desmodur W, abbreviated as H12MDI), and the mixture was heated to a temperature of 80 to 85° C. with thoroughly stirring.

Subsequently, the reaction vessel was charged at once with 0.2342 parts by mass of 2-ethylhexyl alcohol (manufactured by Wako Pure Chemicals Industries, Ltd., abbreviated as 2-EtOH) as a monol. After the reaction was continued for about 2 hours, it was confirmed that the isocyanate content had dropped to 2.7% by mass, so that an isocyanate group-terminated prepolymer was obtained.

Thereafter, the reaction vessel was charged at once with 0.4482 parts by mass of the dispersion stabilizer (I) and 67.98 parts by mass of n-heptane which were preliminarily mixed, and the isocyanate group-terminated prepolymer was dispersed over 1 hour.

Then, as a chain extender, 2.899 parts by mass of 1,4-butanediol (manufactured by Wako Pure Chemicals Industries, Ltd., abbreviated as 1,4-BD) was charged therein, and the mixture was thereafter allowed to react at that temperature for 5 hours, to obtain a dispersion of thermoplastic polyurethane resin.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin was colored.

Example 3

A reaction vessel equipped with a nitrogen introducing tube, a thermometer, a condenser tube, and a stirrer was charged with 84.25 parts by mass of Takelac U-2024 (manufactured by MITSUI CHEMICALS POLYURETHANES, INC., number average molecular weight: 2000, adipate polyester polyol) as a high-molecular-weight polyol, 0.50 parts by mass of IRGANOX 245 (manufactured by Ciba Specialty Chemicals K. K.) as an antioxidant, 0.50 parts by mass of Tinuvin 213 (manufactured by Ciba Specialty Chemicals K. K.) as a benzotriazol type ultraviolet absorber, 0.49 parts by mass of Tinuvin 765 (manufactured by Ciba Specialty Chemicals K. K.) as a hindered amine light stabilizer, and 13.42 parts by mass of 1,4-BIC as a polyisocyanate, and the mixture was heated to a temperature of 80 to 85° C. with thoroughly stirring.

Subsequently, the reaction vessel was charged at once with 0.2398 parts by mass of 2-ethylhexyl alcohol (manufactured by Wako Pure Chemicals Industries, Ltd., abbreviated as 2-EtOH) as a monol. After the reaction was continued for about 2 hours, it was confirmed that the isocyanate content had dropped to 2.00% by mass, so that an isocyanate group-terminated prepolymer was obtained.

Thereafter, the reaction vessel was charged at once with 0.4523 parts by mass of the dispersion stabilizer (I) and 68.53 parts by mass of n-heptane which were preliminarily mixed, and the isocyanate group-terminated prepolymer was dispersed over 1 hour.

Then, as a chain extender, 2.159 parts by mass of 1,4-butanediol (manufactured by Wako Pure Chemicals Industries, Ltd., abbreviated as 1,4-BD) was charged therein, and the mixture was thereafter allowed to react at that temperature for 3 hours, to obtain a dispersion of thermoplastic polyurethane resin.

Thereafter, the reaction temperature of the dispersion was lowered to 60° C., 2.003 parts by mass of a mixture of dipentaerythritol hexaacrylate and dipentaerythritol pentaacrylate (manufactured by Nippon Kayaku Co., Ltd., trade name: KAYARAD DPHA) as a thermally crosslinkable monomer and 1.000 part by mass of p-methoxyphenol (abbreviated as MQ) as a polymerization inhibitor per 100 parts by mass of the thermally crosslinkable monomer were charged in the dispersion of the thermoplastic polyurethane resin, and mixed for 2 hours.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by

Example 4

A reaction vessel equipped with a nitrogen introducing tube, a thermometer, a condenser tube, and a stirrer was charged with 63.39 parts by mass of Takelac U-2024 (manufactured by MITSUI CHEMICALS POLYURETHANES, INC., number average molecular weight: 2000, adipate polyester polyol) as a high-molecular-weight polyol, 21.71 parts by mass of polyol A in Preparation Example 3, 0.50 parts by mass of IRGANOX 245 (manufactured by Ciba Specialty Chemicals K. K.) as an antioxidant, 0.50 parts by mass of Tinuvin 213 (manufactured by Ciba Specialty Chemicals K. K.) as a benzotriazol type ultraviolet absorber, 0.48 parts by mass of Tinuvin 765 (manufactured by Ciba Specialty Chemicals K. K.) as a hindered amine light stabilizer, and 12.58 parts by mass of 1,4-BIC as a polyisocyanate, and the mixture was heated to a temperature of 80 to 85° C. with thoroughly stirring.

Subsequently, the reaction vessel was charged at once with 0.2253 parts by mass of 2-ethylhexyl alcohol (manufactured by Wako Pure Chemicals Industries, Ltd., abbreviated as 2-EtOH) as a monol. After the reaction was continued for about 2 hours, it was confirmed that the isocyanate content had dropped to 1.88% by mass, so that an isocyanate group-terminated prepolymer was obtained.

Thereafter, the reaction vessel was charged at once with 0.4518 parts by mass of the dispersion stabilizer (I) and 68.62 parts by mass of n-heptane which were preliminarily mixed, and the isocyanate group-terminated prepolymer was dispersed over 1 hour.

Then, as a chain extender, 2.025 parts by mass of 1,4-butanediol (manufactured by Wako Pure Chemicals Industries, Ltd., abbreviated as 1,4-BD) was charged therein, and the mixture was thereafter allowed to react at that temperature for 3 hours, to obtain a dispersion of thermoplastic polyurethane resin.

Thereafter, the reaction temperature of the dispersion was lowered to 60° C., and 2.996 parts by mass of a mixture of dipentaerythritol hexaacrylate and dipentaerythritol pentaacrylate (manufactured by Nippon Kayaku Co., Ltd., trade name: KAYARAD DPHA) as a thermally crosslinkable monomer and 1.000 part by mass of p-methoxyphenol (abbreviated as MQ) as a polymerization inhibitor per 100 parts by mass of the thermally crosslinkable monomer were charged in the dispersion of the thermoplastic polyurethane resin, and mixed for 2 hours.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin was colored.

Comparative Example 1

A reaction vessel equipped with a nitrogen introducing tube, a thermometer, a condenser tube, and a stirrer was charged with 63.05 parts by mass of Takelac U-2024 (manufactured by MITSUI CHEMICALS POLYURETHANES, INC., number average molecular weight: 2000, adipate polyester polyol) as a high-molecular-weight polyol, 0.51 parts by mass of IRGANOX 245 (manufactured by Ciba Specialty Chemicals K. K.) as an antioxidant, 0.50 parts by mass of Tinuvin 213 (manufactured by Ciba Specialty Chemicals K. K.) as a benzotriazol type ultraviolet absorber, 0.49 parts by mass of Tinuvin 765 (manufactured by Ciba Specialty Chemicals K. K.) as a hindered amine light stabilizer, 12.23 parts by mass of 1,4-BIC, and 14.95 parts by mass (i.e., the molar ratio of 1,4-BIC/1,3-BIC is 45/55) of 1,3-bis(isocyanatomethyl)cyclohexane (manufactured by MITSUI CHEMICALS POLYURETHANES, INC., trade name: TAKENATE 600, abbreviated as 1,3-BIC) as a polyisocyanate, and the mixture was heated to a temperature of 80 to 85° C. with thoroughly stirring.

Subsequently, the reaction vessel was charged at once with 0.3532 parts by mass of 2-ethylhexyl alcohol (manufactured by Wako Pure Chemicals Industries, Ltd., abbreviated as 2-EtOH) as a monol and 0.0278 parts by mass of dibutyltin dilaurate (manufactured by Wako Pure Chemicals Industries, Ltd.) as a urethanizing catalyst. After the reaction was continued for about 2 hours, it was confirmed that the isocyanate content had dropped to 9.62% by mass, so that an isocyanate group-terminated prepolymer was obtained.

Thereafter, the reaction vessel was charged at once with 0.4185 parts by mass of the dispersion stabilizer (I) and 63.38 parts by mass of n-heptane which were preliminarily mixed, and the isocyanate group-terminated prepolymer was dispersed over 1 hour.

Then, as a chain extender, 9.402 parts by mass of 1,4-butanediol (manufactured by Wako Pure Chemicals Industries, Ltd., abbreviated as 1,4-BD) was charged therein, and the mixture was thereafter allowed to react at that temperature for 5 hours, to obtain a dispersion of thermoplastic polyurethane resin.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin was colored.

Comparative Example 2

A reaction vessel equipped with a nitrogen introducing tube, a thermometer, a condenser tube, and a stirrer was charged with 63.06 parts by mass of Takelac U-2024 (manufactured by MITSUI CHEMICALS POLYURETHANES INC., number average molecular weight: 2000, adipate polyester polyol) as a high-molecular-weight polyol, 0.51 parts by mass of IRGANOX 245 (manufactured by Ciba Specialty Chemicals K. K.) as an antioxidant, 0.50 parts by mass of Tinuvin 213 (manufactured by Ciba Specialty Chemicals K. K.) as a benzotriazol type ultraviolet absorber, 0.49 parts by mass of Tinuvin 765 (manufactured by Ciba Specialty Chemicals K. K.) as a hindered amine light stabilizer, and 27.19 parts by mass of 1,3-bis(isocyanatomethyl)cyclohexane (manufactured by MITSUI CHEMICALS POLYURETHANES, INC., trade name: TAKENATE 600) as a polyisocyanate, and the mixture was heated to a temperature of 80 to 85° C. with thoroughly stirring.

Subsequently, the reaction vessel was charged at once with 0.3532 parts by mass of 2-ethylhexyl alcohol (manufactured by Wako Pure Chemicals Industries, Ltd., abbreviated as 2-EtOH) as a monol and 0.0268 parts by mass of dibutyltin dilaurate (manufactured by Wako Pure Chemicals Industries, Ltd.) as a urethanizing catalyst. After the reaction was continued for about 2 hours, it was confirmed that the isocyanate content had dropped to 9.63% by mass, so that an isocyanate group-terminated prepolymer was obtained.

Thereafter, the reaction vessel was charged at once with 0.4176 parts by mass of the dispersion stabilizer (I) and 63.38 parts by mass of n-heptane which were preliminarily mixed, and the isocyanate group-terminated prepolymer was dispersed over 1 hour.

Then, as a chain extender, 9.401 parts by mass of 1,4-butanediol (manufactured by Wako Pure Chemicals Industries, Ltd., abbreviated as 1,4-BD) was charged therein, and the mixture was thereafter allowed to react at that temperature for 5 hours, to obtain a dispersion of thermoplastic polyurethane resin.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin was colored.

Comparative Example 3

A reaction vessel equipped with a nitrogen introducing tube, a thermometer, a condenser tube, and a stirrer was charged with 77.35 parts by mass of Takelac U-2024 (manufactured by MITSUI CHEMICALS POLYURETHANES, INC., number average molecular weight: 2000, adipate polyester polyol) as a high-molecular-weight polyol, 0.51 parts by mass of IRGANOX 245 (manufactured by Ciba Specialty Chemicals K. K.) as an antioxidant, 0.50 parts by mass of Tinuvin 213 (manufactured by Ciba Specialty Chemicals K. K.) as a benzotriazol type ultraviolet absorber, 0.48 parts by mass of Tinuvin 765 (manufactured by Ciba Specialty Chemicals K. K.) as a hindered amine light stabilizer, and 16.88 parts by mass of hexamethylene diisocyanate (TAKENATE 700 manufactured by MITSUI CHEMICALS POLYURETHANES, INC., abbreviated as HDI) as a polyisocyanate, and the mixture was heated to a temperature of 80 to 85° C. with thoroughly stirring.

Subsequently, the reaction vessel was charged at once with 0.6150 parts by mass of 2-ethylhexyl alcohol (manufactured by Wako Pure Chemicals Industries, Ltd., abbreviated as 2-EtOH) as a monol. After the reaction was continued for about 2 hours, it was confirmed that the isocyanate content had dropped to 5.00% by mass, so that an isocyanate group-terminated prepolymer was obtained.

Thereafter, the reaction vessel was charged at once with 0.4378 parts by mass of the dispersion stabilizer (I) and 66.38 parts by mass of n-heptane which were preliminarily mixed, and the isocyanate group-terminated prepolymer was dispersed over 1 hour.

Then, as a chain extender, 5.199 parts by mass of 1,4-butanediol (manufactured by Wako Pure Chemicals Industries, Ltd., abbreviated as 1,4-BD) was charged therein, and the mixture was thereafter allowed to react at that temperature for 5 hours, to obtain a dispersion of thermoplastic polyurethane resin.

Next, this dispersion was cooled to 30° C. or below and the solid was separated by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 min$^{-1}$ for 1 minute. Then, the mixture was screened through a 48 mesh sieve and further through a 200 mesh sieve, and the granular polyurethane resin was colored.

Comparative Example 4

A reaction vessel equipped with a nitrogen introducing tube, a thermometer, a condenser tube, and a stirrer was charged with 64.48 parts by mass of Takelac U-2024 (manufactured by MITSUI CHEMICALS POLYURETHANES, INC., number average molecular weight: 2000, adipate polyester polyol) as a high-molecular-weight polyol, 0.51 parts by mass of IRGANOX 245 (manufactured by Ciba Specialty Chemicals K. K.) as an antioxidant, 0.51 parts by mass of Tinuvin 213 (manufactured by Ciba Specialty Chemicals K. K.) as a benzotriazol type ultraviolet absorber, 0.49 parts by mass of Tinuvin 765 (manufactured by Ciba Specialty Chemicals K. K.) as a hindered amine light stabilizer, and 28.48 parts by mass of 4,4'-methylenebis(cyclohexylisocyanate) (manufactured by Sumika Bayer Urethane Co., Ltd., trade name: Desmodur W) as a polyisocyanate, and the mixture was heated to a temperature of 80 to 85° C. with thoroughly stirring.

Subsequently, the reaction vessel was charged at once with 0.3159 parts by mass of 2-ethylhexyl alcohol (manufactured by Wako Pure Chemicals Industries, Ltd., abbreviated as 2-EtOH) as a monol and 0.0285 parts by mass of dibutyltin dilaurate (manufactured by Wako Pure Chemicals Industries, Ltd.) as a urethanizing catalyst. After the reaction was continued for about 2 hours, it was confirmed that the isocyanate content had dropped to 6.52% by mass, so that an isocyanate group-terminated prepolymer was obtained.

Thereafter, the reaction vessel was charged at once with 0.4301 parts by mass of the dispersion stabilizer (I) and 65.31 parts by mass of n-heptane which were preliminarily mixed, and the isocyanate group-terminated prepolymer was dispersed over 1 hour.

Then, as a chain extender, 6.640 parts by mass of 1,4-butanediol (manufactured by Wako Pure Chemicals Industries, Ltd., abbreviated as 1,4-BD) was charged therein, and the mixture was thereafter allowed to react at that temperature for 5 hours, to obtain a dispersion of thermoplastic polyurethane resin.

Next, the dispersion was cooled to 30° C. or below and the solid was collected by filtration.

Subsequently, a dryer was charged with 100 parts by mass of the solid, 0.5 parts by mass of TSF-451-3000 (silicone oil manufactured by GE Toshiba Silicones Co., Ltd.) as a releasing agent, and 0.3 parts by mass of an antiblocking agent, and the mixture was dried at 40° C. for 3 hours with stirring under reduced pressure. Thereafter, the resulting content was cooled to 25° C. or below and then discharged to produce a granular polyurethane resin.

To 100 parts by mass of the granular polyurethane resin thus produced, 0.6 parts by mass of a carbon black/calcium carbonate dispersion (manufactured by Sumika Color CO., LTD., trade name: PV-817) and 0.4 parts by mass of a carbon black/calcium carbonate dispersion (manufactured by Sumika Color CO., LTD., trade name: PV-801) as pigments were supplied in a Henschel mixer and stirred at a rotational speed of 700 $min^{-1}$ for 1 minute. Then, the mixture was screened through a 48 mesh sieve and further through a 200 mesh sieve, and the granular polyurethane resin was colored.

Evaluation of Physical Properties

Solidification temperature, mold releasability and dimensional change of the skin, and flow start and end temperatures of the granular polyurethane resin composition (hereinafter abbreviated as each powder) obtained in each of Examples and Comparative Examples were measured by the following methods.

Further, after an embossing mold was heated to 240° C., 300 g of each powder was sprayed onto the mold having a vertical length of 15 cm and a horizontal length of 15 cm, and allowed to stand for 8 seconds. Thereafter, unfused excess powder was discarded. Subsequently, the mold was allowed to stand at 250° C. for 60 seconds, and then water-cooled to be molded into an about 1-mm-thick sheet. Then, the physical properties of the molded article were determined by the following methods. The results were shown in Table 1.

Each powder had a volume-average particle size of about 110 to 180 nm. The volume-average particle size of each powder was determined by measuring the volume-average particle size of each powder which was replaced with and dispersed in n-heptane, using a particle size analyzer (manufactured by Nikkiso Co., Ltd., model: MICROTRAC HRA). The average particle size refers to a value of 50 cumulative percentages in the particle size distribution curve on a volume percentage basis.

<Mold Releasability (Solidification Temperature (° C.))>

The mold releasability was determined using a differential scanning calorimeter (DSC, manufactured by SEIKO Instruments Inc., trade name: SSC5200H Disk Station and DSC220C).

About 9 mg of powder was weighed to be determined as a sample, and alumina was sampled to be determined as a reference. After these samples were placed on the DSC measuring apparatus, the temperature was lowered from room temperature to −90° C. at a rate of 10° C./min under a nitrogen flow having a nominal flow rate of 40 N ml/min, maintained at −90° C. for 5 minutes, then heated from −90° C. to 250° C. at a rate of 10° C./min, and maintained at 250° C. for 5 minutes. Subsequently, the temperature was lowered from 250° C. to −90° C. at a rate of 10° C./min. The temperature at an exothermic peak derived from powders observed in this temperature lowering process was determined as solidification temperature. In Table 1, "n. d." represents not detected.

<Mold Releasability (Mold Releasability and Dimensional Change (%) of Skin (Sheet))>

In the above-mentioned operation method, slush molding was performed, the mold was cooled to room temperature, and the sheet was released from the mold. The sheet was allowed to stand in a laboratory at 23° C. for about 24 hours, and then the sheet and the mold was compared in terms of vertical length. The vertical length of the molded sheet was measured based on the vertical length of the mold and was evaluated according to the following criteria. When the dimensional change after the mold release was small, the mold releasability was judged to be good.

When the vertical length of the sheet after released from the mold was set to L2 (mm) and the vertical length of the mold was set to L1 (mm), the dimensional change was defined as an absolute value determined by the following formula: |(L2−L1)/L1×100|.

(Evaluation Criteria)

"A": The dimensional change of the sheet was less than 1.5%.

"B": The dimensional change of the sheet was 1.5% or more and 2.5% or less.

"C": The dimensional change of the sheet exceeded 2.5%, and a tuck remarkably remained on the surface of the sheet.

<Fusibility (Flow Start Temperature (° C.) and Flow End Temperature (° C.))>

Using a flow tester (manufactured by Shimadzu Corp., trade name: CFT-500D), the fusibility was determined with a die having a length of 10 mm and a bore diameter of 1.0 mm. Weighed was 1.7 g of powder and charged in the measuring apparatus. Thereafter, a flow start temperature (Tfb) (° C.) and a flow end temperature (Tend) (° C.) were measured on the conditions of a load of 196 N (20 kgf) and a heating rate of 2.5° C./min. In Table 1, the difference (Tend-Tfb (° C.)) between the flow end temperature (Tend) and the flow start temperature (Tfb) was shown together.

<Fusibility (Skin Rear Surface Gloss)>

The gloss of the rear surface (unembossed surface) of the sheet was measured using a gloss meter (manufactured by Nippon Denshoku Industries Co., Ltd., Model type: Gloss Meter VG2000). It was judged that the fusibility of the powder was high with high gloss and some powders remained unfused with low gloss.

Feel (Bending Wrinkles)

A sheet being bent by 180° was kept for 20 seconds, then returned to its original state, and allowed to stand for a whole day and night. The bent portion was visually observed and evaluated in accordance with the following criteria. When the sheet was hard or limp, bending wrinkles were likely to be observed.

Evaluation Criteria

"A": Bending wrinkles were not observed.
"B": Bending wrinkles were slightly observed.
"C": Bending wrinkles were apparently observed.

Design

As for the sheet obtained by molding each powder and then allowing the molded powder to stand in a thermostatic chamber at 23° C. and 55% RH for two months, the existences of blooming, embossing flow, and a gloss change were visually evaluated.
(Evaluation Criteria)
"A": Blooming, embossing flow, and a gloss change were not observed.
"B": Blooming and embossing flow were not observed but a gloss change was observed.
"C": Either blooming or embossing flow was observed.
<Design (Analysis of Polyisocyanate)>
The surface of the sheet obtained by molding each powder and then allowing the molded powder to stand in a thermostatic chamber at 23° C. and 55% RH for two months was wiped off with cotton wool preliminarily moistened with methanol. Thereafter, the cotton wool was washed with methanol and was determined as a sample. The polyisocyanate in the methanol impregnated in the sample was analyzed by GC-MS on the following conditions. It should be noted that the detection limit of GC-MS was 10 ppm, and when it detected not less than 10 ppm, it was judged as "detected", and when less than 10 ppm, "less than detection limit".

GC-MS apparatus: Manufactured by Hewlett Packard Co., trade name: HP6890 type GC and HP5973 type MS detector
Column: Manufactured by Frontier Laboratories Ltd., trade name: UADX30-30M-0.15F
Carrier gas: Helium
Injection temperature: 250° C.
Column temperature: Kept at 50° C. for 5 minutes and then heated up to 350° C. at a rate of 10° C./min
<Heat Resistance (Gloss, Embossing Flow, and Strength Retention)>
Each of the sheets obtained by slush molding was allowed to stand in a constant temperature room at 23° C. and 55% RH for two weeks, thereafter allowed to stand in a hot air circulation type oven for 500 hours, and subjected to heat treatment. After the heat treatment, the gloss of the sheet surface was measured. The gloss was measured using a gloss meter (manufactured by Nippon Denshoku Industries Co., Ltd., Model type: Gloss Meter VG2000). It was judged that the appearance changed with high gloss. Further, the existence of the embossing flow after the heat treatment was visually observed. When the embossing flow was observed, the heat resistance was judged to be low.

Further, the tensile strength of the sheet before and after the heat treatment was measured, and the strength retention (%) was calculated by dividing the tensile strength of the sheet after the heat treatment by the tensile strength before the heat treatment, and then multiplying the result by 100.

According to the method described in JIS K-6251, the tensile strength of the sheet was determined by stamping out a test piece with a JIS-No. 4 dumbbell, and measuring it using a tensile strength testing machine (manufactured by ORIENTEC Co., LTD, trade name: universal tensile testing machine RTA-500) at a tensile speed of 300 mm/min.

[Table 1]

TABLE 1

| Composition | | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|---|
| Thermoplastic Polyurethane Resin (part by mass) | | | 100 | 100 | 100 | 100 | 100 | 100 | 100 | 100 |
| | Polyisocyanate | 1,4-BIC (part by mass) | 13.40 | 13.21 | 13.42 | 12.58 | 12.23 | — | — | — |
| | | 1,3-BIC (part by mass) | — | — | — | — | 14.95 | 27.19 | — | — |
| | | HDI (part by mass) | — | — | — | — | — | — | 16.88 | — |
| | | H12MDI (part by mass) | — | 1.99 | — | — | — | — | — | 28.48 |
| | Chain Extender | 1,4-BD (part by mass) | 2.156 | 2.899 | 2.159 | 2.025 | 9.402 | 9.401 | 5.199 | 6.640 |
| | High-Molecular-Weight Polyol | Takelac U-2024 (part by mass) | 84.25 | 81.16 | 84.25 | 63.39 | 63.05 | 63.06 | 77.35 | 64.48 |
| | | Polyol A (part by mass) | — | — | — | 21.71 | — | — | — | — |
| | Monol | 2-EtOH (part by mass) | 0.2399 | 0.2342 | 0.2398 | 0.2253 | 0.3532 | 0.3532 | 0.6150 | 0.3159 |
| Thermally Crosslinkable Monomer (part by mass) | | KAYARAD DPHA | — | — | 2.003 | 2.996 | — | — | — | — |
| Polymerization Inhibitor (part by mass per 100 parts by mass of thermally crosslinkable monomer) | | MQ | — | — | 1.000 | 1.000 | — | — | — | — |
| Evaluation | Mold Releasability | Solidification Temperature (° C.) | 59.5 | 71.8 | 62.3 | 60.2 | n.d. | n.d. | 78 | n.d. |
| | | Mold Releasability of Skin | A | A | A | A | B | C | A | C |
| | | Dimensional Change (%) | 0.53% | 1.33% | 0.67% | 0.80% | 2.33% | 3.33% | 1.00% | 2.87% |
| | Fusibility | Flow Start Temperature (Tfb) (° C.) | 130.2 | 125.7 | 131.3 | 138.3 | 137.7 | 136.1 | 143.9 | 102.8 |
| | | Flow End Temperature (Tend) (° C.) | 145.9 | 142.8 | 150.1 | 158.1 | 175.1 | 172.5 | 172.2 | 123.6 |

TABLE 1-continued

| Composition | | Ex. 1 | Ex. 2 | Ex. 3 | Ex. 4 | Comp. Ex. 1 | Comp. Ex. 2 | Comp. Ex. 3 | Comp. Ex. 4 |
|---|---|---|---|---|---|---|---|---|---|
| | Tend – Tfb (° C.) | 15.7 | 17.1 | 18.8 | 19.8 | 37.4 | 36.4 | 28.3 | 20.8 |
| | Skin Rear Surface Gloss | 35 | 45 | 37 | 34 | 18 | 8 | 11 | 72 |
| Feel | Bending Wrinkles | A | A | A | A | A | B | C | A |
| Design | | A | A | A | A | B | C | C | B |
| | Analysis of Polyisocyanate | Less than detection limit | Less than detection limit | Less than detection limit | Less than detection limit | Less than detection limit | Less than detection limit | Detected | Less than detection limit |
| Heat Resistance | Gloss After Heat Treatment | 2.2 | 2.3 | 2.1 | 2.0 | 35 | 30 | 2.2 | 60 |
| | Embossing Flow After Heat Treatment | Not observed | Not observed | Not observed | Not observed | Observed | Observed | Not observed | Observed |
| | Strength Retention After Heat Treatment (%) | 76.3% | 72.1% | 78.6% | 79.6% | 23.2% | 12.3% | 76.6% | 13.4% |

While the illustrative embodiments of the present invention are provided in the above description, such is for illustrative purpose only and it is not to be construed restrictively. Modification and variation of the present invention that will be obvious to those skilled in the art is to be covered by the following claims.

INDUSTRIAL APPLICABILITY

The granular polyurethane resin composition of the present invention is suitably used for slush molding.

The invention claimed is:

1. A slush molding material consisting of granular polyurethane resin composition comprising a thermoplastic polyurethane resin comprising a hard segment formed by a reaction between a polyisocyanate containing isocyanate groups of 1,4-bis(isocyanatomethyl)cyclohexane in a proportion of not less than 50% by mole relative to the total mole number of isocyanate groups, and a chain extender,
wherein the 1,4-bis(isocyanatomethyl)cyclohexane contains 80% to 93% by mole of trans-1,4-bis(isocyanatomethyl)cyclohexane.

2. The slush molding material consisting of granular polyurethane resin composition according to claim 1, having a solidification temperature, determined by a differential scanning calorimeter, of 0 to 140° C.

3. The slush molding material consisting of granular polyurethane resin composition according to claim 1, having a flow start temperature, determined by a flow tester, of 100 to 180° C.

4. The slush molding material consisting of granular polyurethane resin composition according to claim 1, further comprising a thermally crosslinkable monomer.

5. The slush molding material consisting of granular polyurethane resin composition according to claim 4, comprising a polymerization inhibitor in an amount of 0.1 to 6 parts by mass relative to 100 parts by mass of the thermally crosslinkable monomer.

6. The slush molding material consisting of granular polyurethane resin composition according to claim 1, wherein the thermoplastic polyurethane resin comprises a vinyl monomer-modified polyol obtained by a reaction between a high-molecular—weight polyol and a vinyl monomer.

7. A molded article obtained by slush molding a granular polyurethane resin composition of claim 1.

8. The molded article according to claim 7, being an automobile interior trim article.

* * * * *